US005956413A

United States Patent [19]

Öste et al.

[11] Patent Number: 5,956,413

[45] Date of Patent: Sep. 21, 1999

[54] METHOD AND DEVICE FOR AUTOMATIC EVALUATION OF CEREAL GRAINS AND OTHER GRANULAR PRODUCTS

[75] Inventors: Rickard Öste; Peter Egelberg; Carsten Peterson; Patrik Söderlund, all of Lund; Lennart Sjöstedt, Åryd, all of Sweden

[73] Assignee: Agrovision AB, Lund, Sweden

[21] Appl. No.: 08/997,548

[22] Filed: Dec. 23, 1997

Related U.S. Application Data

[63] Continuation of application No. 08/397,165, Mar. 7, 1995, abandoned.

[30] Foreign Application Priority Data

Sep. 7, 1992 [SE] Sweden .................................. 9202584

[51] Int. Cl.[6] ...................................................... G06K 9/00

[52] U.S. Cl. ............................................ 382/110; 382/156

[58] Field of Search ............................ 382/110, 155–159, 382/227; 209/511; 348/86, 125; 706/23

[56] References Cited

U.S. PATENT DOCUMENTS

| | | | |
|---|---|---|---|
| 4,975,863 | 12/1990 | Sistler et al. | 382/110 |
| 5,259,038 | 11/1993 | Sakou et al. | 382/158 |
| 5,317,645 | 5/1994 | Perozek et al. | 364/555 |
| 5,321,764 | 6/1994 | Cullen et al. | 364/555 |
| 5,321,795 | 6/1994 | Alvarez de Toledo | 706/23 |

FOREIGN PATENT DOCUMENTS

| | | |
|---|---|---|
| 3443476 | 5/1986 | Germany . |
| 3701335 | 7/1988 | Germany . |
| 59-143941 | 8/1984 | Japan . |
| 2083436 | 3/1990 | Japan . |
| 2012948 | 8/1979 | United Kingdom . |

OTHER PUBLICATIONS

WO 91/17525 International Publication date: Nov. 14, 1991.

Floyd Dowell, "An Intelligent Automated System For Determining Peanut Quality".

*Primary Examiner*—Christopher S Kelley
*Attorney, Agent, or Firm*—Birch, Stewart, Kolasch & Birch, LLP

[57] ABSTRACT

In automatic evaluation of cereal kernels or like granular products handled in bulk, the kernels are conveyed on a vibrating conveyor belt (15). Owing to the vibrations, the kernels are spread and settled in grooves (14) in the belt so as to be oriented in essentially the same direction. A video camera (40) produces digital images of all the kernels on the belt. The kernels are identified in the images, and for each kernel input signals are produced and then sent to a neural network based on picture element values for the picture elements representing each kernel. A neural network then determines which of a plurality of predetermined classes that each kernel belongs.

11 Claims, 3 Drawing Sheets

METHOD AND DEVICE FOR AUTOMATIC EVALUATION OF CEREAL GRAINS AND OTHER GRANULAR PRODUCTS

This application is a continuation of 08/397,165 filed Mar. 7, 1995 now abandoned.

BACKGROUND OF THE INVENTION

The present invention relates to a method and a device for automatic evaluation of cereal kernels or grains and similar granular products, e.g. beans, rice and seeds, which are handled in bulk.

Each shipment of cereals may contain a certain amount of kernels of some other kind of cereal than the desired one, for example rye and wild oats in shipments of wheat, and of kernels which per se are of the desired kind but which are of unsatisfactory quality, for example broken-off kernels, kernels chewed by animals, green kernels and burnt kernels. Also stones and other objects are to be found among the kernels.

Since the payment for cereal kernels is based on purity and quality, it is important that these parameters can be evaluated correctly. Today, the evaluation is carried out manually by visual inspection of samples from cereal shipments, and weighing of the different amounts of kernels of incorrect kinds and of kernels of the correct kind but of unsatisfactory quality. It is instead desirable to be able to make this evaluation automatically.

When exporting and importing cereals, there is a need of being able to quickly characterise the cereals for purity, homogeneity and evenness in colour. Today there is no equipment for effecting this automatically.

In the handling of cereals in, among other countries, the U.S.A., Canada and Australia, staff is available to evaluate the composition of the supplied cereals to determine the suitable future use (pasta products, bread, feed etc.). Since this evaluation can be made by experienced staff only, it would be a great advantage if, instead, it could be effected automatically.

In the handling of cereals it is also important that the size of the kernels can be evaluated. This is now carried out by letting the kernels pass a number of sieves having a gradually diminishing width of mesh. It is desirable that the size evaluation can be carried out in a more rational manner.

Scientific literature comprises examples of experiments being made to evaluate cereals by means of computerised image analysis. An article by Sapirstein et al. in Cereal Science No. 6, 1987, p. 3, describes an experiment of classifying wheat, rye, barley and oat kernels by means of different contour parameters. By analysing a statistically calculated combination of length/width, width, moment and length of circumference, an image analysing program could identify kernels with an accuracy of more than 97%.

An article by Zayas et al. in Cereal Chemistry 66(3), 1989, p. 233, describes an image analysing system for determining “non-wheat components” in samples of wheat. The shape of the wheat kernels is described by means of 10 geometrical parameters, and furthermore a measure of the colour of the wheat kernels is used, expressed in grey scale.

The above-mentioned systems are, however, not commercially applicable since they are experimental and based on the fact that the kernels are presented manually one by one to the image analysing systems.

In patent literature there are also examples of systems for automatic evaluation of cereal kernels and other objects.

GB 2,012,948 discloses a method of determining the distribution of sizes for samples of, inter alia, cereal kernels. According to this method, the kernels are caused to fall between a screen which is illuminated by a stroboscope, and a video camera by means of which images of the kernels are produced. The video images are digitised and the kernels are identified in the images. Based on the size of each image of a kernel, the distribution of sizes of the kernels in the sample is determined. By this method, it is, however, not possible to classify the kernels. Moreover, it is not possible to determine the size of all kernels.

WO 91/17525 discloses a method for automatically classifying an object into predetermined classes. According to this method, a video camera takes time-domain images of objects which are carried one by one on a conveyor belt past the camera. The time-domain images are transformed by Fourier analysis into frequency-domain signals which form input signals to a neural network effecting the actual classification. By this method, it is not possible to analyse a sufficient amount of objects per unit of time to make the method commercially useful for classification of cereals.

SUMMARY OF THE INVENTION

The object of the present invention is to provide a method and a device for automatic evaluation of granular products handled in bulk, especially cereal kernels, which method and device can replace the human inspection and evaluation. To make such a method and device commercially useful, it must be possible to analyse a sample in about the same time it takes today to analyse it manually. More precisely, this means that it must be possible to classify and determine the weight of a sample, of about 1500 cereal kernels, in about 5 min. Furthermore, the accuracy in the classifying procedure must be high. For example, it must be possible to determine the percentage weight distribution of the different components in a wheat sample with an accuracy of about 0.2% of the weight of the entire sample. Since a sample of cereals may contain stones and other foreign objects, it is also required that such objects are identifiable in the evaluation. Besides, it should be possible to determine the size distribution and colour distribution of the sample. In certain applications, it is also of interest to be able to determine the shape of the kernels. Finally, it should be pointed out that it must be possible to classify all kernels included in a sample and/or determine their size, shape and colour.

The object of the invention is achieved by means of a method and a device having the characteristic features defined in the claims.

The method and the device according to the invention bring the advantage that a sample of cereal kernels can be analysed at least as quickly as if the analysis were carried out manually. This is rendered possible in that a plurality of kernels at a time are presented to a device which produces digital images of the kernels, each image containing a plurality of kernels, but each kernel occurring in one image only. In the presentation, the kernels are preferably oriented in one direction. Since the kernels are presented in this manner, they can quickly and reliably be identified in the digital images. The classification of the kernels is carried out by means of a neural network whose input signals are based on the picture element values of a plurality of picture elements representing the kernel. It has appeared that the use of picture element values as the basis of evaluation for the classification yields high accuracy. It should be noted that by picture element value is here meant a value which is used to represent the picture element; for example the intensity in monochrome images; red, green and blue intensity in RGB representation in colour images; hue, saturation and intensity in HSI representation in colour images.

To increase the quickness of the device, it is advantageous to produce the input signals to the neural network by providing a weighted addition of the picture element values for a plurality of picture elements, thereby compressing the information contents of the picture elements representing a kernel.

When using colour images, a weighted, componentwise addition for each picture element component in a plurality of picture elements has proved to result in high accuracy.

It has further proved advantageous to change from RGB representation to HSI representation, since the latter yields higher reliability in the classification of cereal kernels.

By empirical experiments it has been proved that it is possible to determine a connection between the size of the image of a kernel and the weight of the kernel. This is used to determine the weight of the kernels.

Alternatively, kernels classified into one or more definite classes can be physically separated after the classification procedure, whereupon the separated kernels are weighed separately as are the non-separated kernels, thereby determining the weight of the different fractions.

To avoid that one or two kernels lying close together are incorrectly perceived as a single kernel, the extent of each coherent area of picture elements representing a kernel is determined perpendicular to the longitudinal axis of the area, and it is investigated whether the extent has a minimum (or a plurality of minimums) in some other place than at the ends of the area. If this is the case, the image is estimated to contain two (or more) kernels and is divided at the minimum (s).

The morphological properties of the kernels can be determined by means of the picture elements representing the kernel.

Further embodiments of the device according to the invention are defined in the dependent claims.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

The present invention will now be described by means of an embodiment, reference being made to the accompanying drawings in which.

DESCRIPTION OF THE PREFERRED EMBODIMENTS

Figure 1:
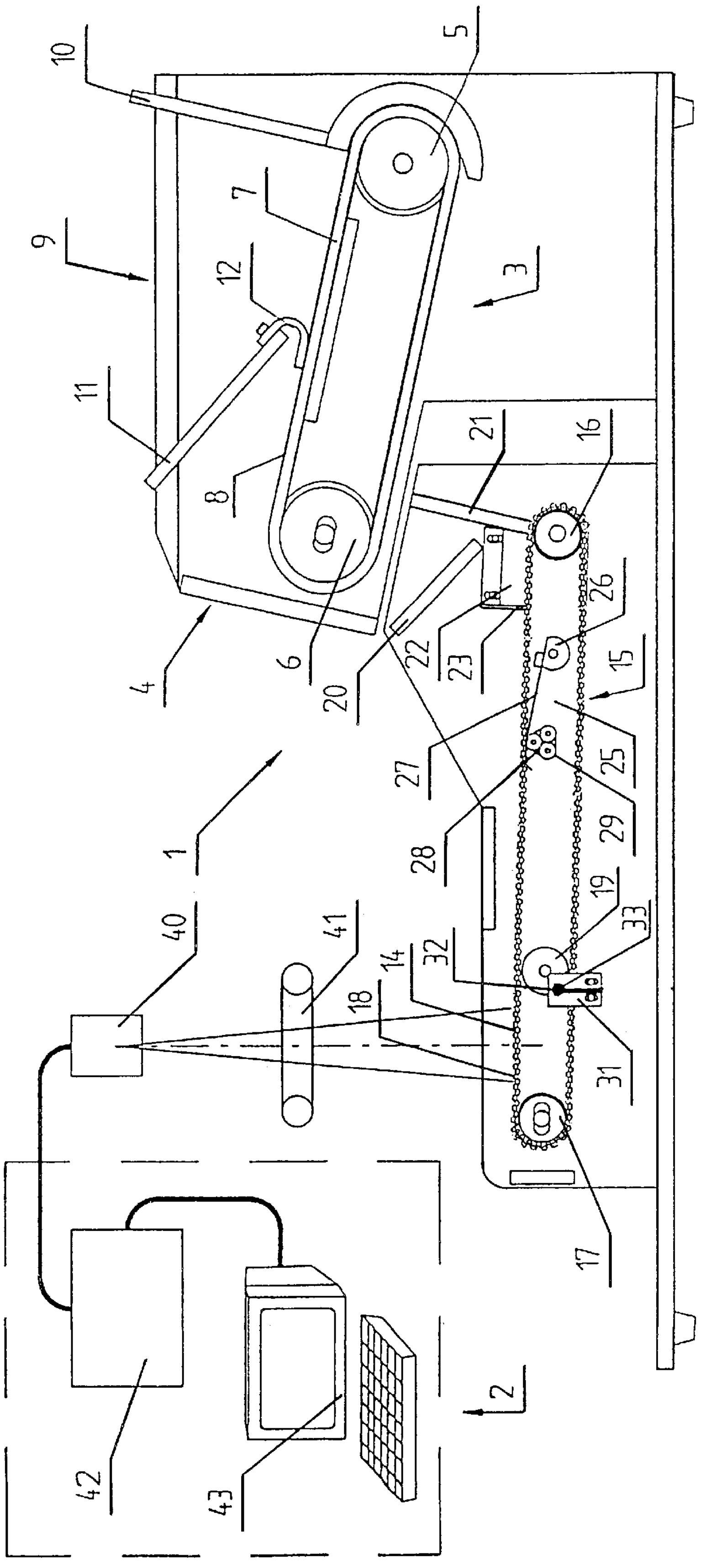
FIG. 1 illustrates an embodiment of a device according to the invention, the feeding device being shown in longitudinal section and the image processing device as a block diagram.

As shown in FIG. 1, the invention essentially comprises a feeding device 1, a video camera 40 and an image processing device 2. The feeding device 1 comprises a first belt conveyor 3 arranged in a casing 4 and having a first wheel 5 driven by a motor (not shown), a second wheel 6, and an endless belt 7 running over the wheels 5, 6. The belt 7 is formed with grooves 8 in which the cereal kernels are portioned out. Alternatively, the belt may have indentations designed in some other manner.

The casing 4 contains a store 9 which tapers off to the belt 7 and which is filled with samples of cereal kernels. The store 9 comprises two plates 10, 11 which are inclined towards one another. The lower end of the plate 10 is spaced from the belt 7, and a scraper 12 is attached to this end to take down the cereal kernels into the grooves 8.

A second belt conveyor 15 is arranged vertically and horizontally offset relative to the first belt conveyor 3. The second belt conveyor 15 comprises a first wheel 16 driven by a motor (not shown), a second wheel 17 and an endless belt 18 running over the first and second wheels 16, 17. The belt 18 is formed with grooves 14 in which the kernels are conveyed. The grooves 14 in the second conveyor are closer to each other than those in the first conveyor, and their width is adjusted to kernels in a given size interval such that the kernels orient themselves in the longitudinal direction of the grooves. The colour of the belt is selected to provide a strong contrast to the background. For analysing cereal kernels, use can preferably be made of e.g. violet. Between the first wheel 16 and the second wheel 17 there is also a third wheel 19, the function of which will be explained below. The first wheel 16 of the second belt conveyor 15 is arranged below the second wheel 6 of the first belt conveyor 3 such that cereal kernels can fall down from the first conveyor 3 onto the second conveyor 15. Two plates 20, 21 are arranged between the first belt conveyor 3 and the second belt conveyor 15. When the kernels fall from the first conveyor, they bounce first against the plate 20 and then against the plate 21, the kernels thereby spreading. At the sides of the second belt conveyor there are arranged, adjacent its first wheel 16, limiting means 22 serving to locate the kernels from the beginning at a certain distance from the edges of the belt 18. The front end of the limiting means 22 in the belt direction is provided with a curtain 23 which is arranged to pass down the kernels into the grooves of the endless belt 18 and ensure that the kernels form one layer and that they do not overlap each other. Between the first wheel 16 and the third wheel 19, and between the upper and lower reach of the belt 18, there is arranged a vibrator 25. The vibrator comprises a shaft 26 to which one end of a metal sheet 27 is attached. Its other end is arranged between a roller 28 driven by a motor (not shown), and the lower side of the belt 18. The end surface of the roller 28 is fitted with three washers 29, mounted with play by means of screws. As the motor rotates the roller 26, the metal sheet 27 will hit the belt with a fixed frequency and produce vibrations in the belt 18. The amplitude of the vibrations is determined by the position of the roller 28 and the play of the washers. Preferably, the amplitude should be the same, independently of the rigidness of the belt.

Adjacent the third wheel 19, there is arranged a tooth detecting unit 31. This is mounted on one side of the circumference of the third wheel 19 and comprises a light emitter in the form of a light diode 32 and a light receiver in the form of a photocell 33. The tooth detecting unit 31 is connected (not shown) to a computer 42. When the third wheel 19 rotates, the tooth detecting unit 31 emits a pulse-shaped signal to the computer 42. The third wheel 19 also serves to damp vibrations in the belt 18 in the area between the third wheel 19 and the second wheel 17.

Above the endless belt 18 in the area adjacent the second wheel 17, there is arranged a video camera 40 in such a manner that images of the belt 18 in the vicinity of the second wheel 17 can be taken. To improve the illumination of the belt there is arranged an annular lamp 41 between the camera and the belt. The camera 40 is connected to the image processing device 2 whose design and function will be described in more detail below.

The function of the feeding device 1 will now be described. A sample of cereal kernels is poured on to the first belt conveyor 3 through the store 9. The kernels then form a heap on the belt, but when the belt moves, they will, owing to the upward inclination of the belt and through the scraper 12, be spread portionwise in the grooves 8 of the belt. When the kernels arrive at the second wheel 6, they fall down, bounce against the plates 20 and 21 and are spread on the second belt 18, the limiting means 22 preventing the kernels from landing on the edges of this belt. Owing to the vibrations of the second belt 18, the advancing kernels will move sideways in the grooves towards the edges of the belt. The kernels positioned on the ridges between the grooves will fall down into the grooves. When the kernels reach the area under the video camera 40, they will therefore be separated in the longitudinal direction of the belt, be oriented in essentially the same direction and be positioned in essentially one layer on the belt. The kernels will thus overlap each other but to a very small extent. The kernels may, however, lie close together in the grooves in the longitudinal direction thereof.

Each time the computer 42 has counted to a predetermined number of teeth, a stop signal is emitted, and the computer 42 stops all driving motors. Then the first and the second belt stop, and the vibrations are discontinued. After a short wait, the computer 42 emits a signal to the video camera 40 which takes an image of the kernels on the belt 18. Subsequently, the motors are started again, and the feeding of the kernels continues as described above until a stop signal is again emitted. The reason why the system waits after the belt conveyor has stopped is that any movements of the kernels should be damped such that the kernels lie still. The third wheel 19 contributes, as mentioned above, to the reduction of the amplitude of the vibrations in the area under the camera 40 such that the waiting time can be kept short. The predetermined number of teeth after which the stop signal is emitted is selected such that the video camera will take images of the belt which cover the belt without interspaces, but without overlappings. In other words, each kernel passing the video camera will occur in exactly one image, and each image will include a plurality of kernels.

Alternatively, the belt can be moved continuously and the lamp 41 can be replaced by a stroboscope which together with the camera 40 is controlled such that images are taken of the belt without interspaces and without overlappings.

The image processing unit 2 fundamentally comprises a computer 42 connected to the video camera 40, and a user terminal 43 on whose display device the result of the analysis is presented. In the computer 42 there are programs for classification and other evaluation of the cereal kernels based on the images produced by the video camera 40. These programs comprise a conversion of the video signals from the camera 40 into suitable input signals to a neural network program which effects the actual classification. If the device is not used for classification, but is used for e.g. determining sizes, the computer need not include the neural network.

When the video camera 40 has taken an image of the belt, this image is read into the computer and digitised by means of a prior art so-called frame grabber. The digitised image produced consists of e.g. 512×512 picture elements. The picture elements are represented by RGB representation, i.e. by a value of the intensity of red colour, a value of the intensity of green colour and a value of the intensity of blue colour. Alternatively, a grey scale or some other colour representation may be used.

In the next step, the program locates the kernels in the digitised image. Here use is made of a threshold value of the colour in each picture element. In order to simplify the processing in this step, it is advantageous to pass from RGB representation to HSI representation (Hue, Saturation and Intensity). When the value of a picture element exceeds,the threshold value, the picture element is assumed to represent a kernel, whereas when the value falls below the threshold value, the picture element is assumed to represent the background. The program examines the image point by point, line by line. When it finds a picture element representing a kernel, it examines all neighbouring picture elements. For those picture elements of the neighbouring picture elements which are considered to represent a kernel, the procedure is repeated until all picture elements connected with the first picture element have been identified. Subsequently, the longitudinal axis of the connected picture elements is determined to represent a kernel. If the direction of the longitudinal axis deviates by more than a predetermined value from the y axis of the image, the coherent kernel area is rotated until its longitudinal axis is parallel with the y axis of the image.

When the image of the kernels on the belt is being taken, it may happen that two or more kernels are positioned close together in a groove of the belt or even overlap one another to some extent. The coherent kernel area identified in the image may thus represent more than one kernel. To check whether this is the case, the number of picture elements in x direction which represent a kernel is summed up for each y value in the coherent kernel area. The program thus makes a histogram of the number of kernel picture elements in x direction. Then an envelope curve of the histogram is determined, and it is investigated whether there is a minimum between the envelope curve terminal points in y direction. A sufficiently marked minimum indicates that the coherent kernel picture element area actually corresponds to two kernels. If so, the program makes a cut in parallel with the x axis at the minimum of the envelope curve. Subsequently, each part of the coherent kernel picture element area is stored as an image of a kernel. If there are a plurality of minimums, a cut is made at each minimum. If a separation of a kernel picture, element area has been carried out, the longitudinal axis of each kernel is determined, and the kernel is rotated, if the deviation from the y axis of the image is greater than the predetermined value. The reason for this is that when the longitudinal axis is determined before the separation, it may happen that the image is not rotated or is rotated incorrectly because the parts each corresponding to a kernel are both inclined relative to the y axis of the image in such a manner that the common longitudinal axis of the kernel picture element area conforms with the y axis. Then, after separation, each kernel is inclined relative to the y axis, which is a drawback in the classification.

After that, the size of each kernel can be determined by counting the number of picture elements in the coherent picture element area representing the kernel. Also the shape and colour of each kernel can be determined by studying the picture elements.

The size determination can also be used to avoid that the image processing device perceives stones and other foreign objects that may join the kernels, as kernels. If the size of a coherent picture element area is not within a certain interval, it is considered to represent a foreign object and is registered as such.

In the next step, the RGB values of the picture elements are converted into HSI values. This conversion is not necessary, but it has appeared that the classification of cereal kernels will be more correct if HSI representation is used instead of RGB representation.

In the following step, the H values are summed up separately, the I values are also summed up separately, as well as the S values, along rows and columns in the image of a kernel. For each y coordinate, first the values of the H component of all x coordinates are thus summed up. Then the corresponding addition for the I value and the S value is carried out. Subsequently, a weighted addition is carried out for each x coordinate for the H value of all y coordinates, whereupon the weighted addition is repeated for the S and I values. The program thus produces one histogram in x direction and one in y direction for each picture element component. This results in a large number of sums. These sums are standardised, the average and the standard deviation for the corresponding sums for previously classified kernels being used in such a manner that if the value of the sum involved is equal to the average of previously classified kernels, its standardised value is set to zero, and if the value of the sum involved deviates more than ±2.5 standard deviations from the average, its value is set to ±1. Sums therebetween are standardised proportionally to the average to values between −1 and +1.

The standardised sums constitute input signals to a neural network. A neural network is a program consisting of a number of input nodes, in this case one for each sum, and a number of output nodes which in this case represent each of the possible classes into which the kernels can be classified. Between the input nodes and output nodes, there are hidden nodes. By feeding input signals representing known kernels to the neural network and telling it into which class the kernel should be classified, the neural network can be trained to classify kernels correctly. When the neural network has learned to classify the different interesting kernels, it can be used to classify previously unseen kernels. The hidden nodes are sigmoid functions, which makes it possible to adapt input data to a substantially arbitrary (linear/non-linear) function. If the classes are linearly dependent on the input nodes, the network is trained to effect a linear discriminant adaptation. The neural network method thus comprises linear discriminant adaptation as a special case.

Each output node is represented by a value between 0 and 1. In the classification, a kernel is evaluated as belonging to the class whose corresponding output node has the greatest value. However, it is also possible to favour a certain kind of cereal. For this purpose, random samples are taken before the classification, it is determined which kind of cereal is predominant, and this is reported to the neural network. If the highest output node value goes below a predetermined value, and the output node which is favoured has the second greatest value, then the kernel is not classified into the class whose output node has the greatest value, but into the class whose output node has the second greatest value. Foreign objects are defined by the value of all output units being lower than a given threshold value.

The result of the classification is presented on the display device of the user terminal 43, for example in the form of a histogram with a bar for each kind of cereal, one for wild oats, one for burnt kernels and one for damaged kernels.

The result can be presented in % by weight of the sample. It has in fact proved to be possible to determine the weight of the kernel by means of the size of its image, since there is a connection between these parameters, which can be determined empirically. In the evaluation, thus the number of picture elements which represent the kernel involved is counted. Based on this number, the size and weight of each kernel can be determined and, consequently, the weight and size distribution of the entire sample.

The shape and colour distribution of the sample can also be determined based on the input signals to the neural network.

The Table below shows an example of ten analyses of a 50 g cereal sample which has been analysed by means of a device according to the invention. The sample consisted of 5.00% rye; 5.00% oats; 5.00% barley; 5.00% burnt wheat kernels; 0.00% wild oats; 5.00% damaged wheat kernels and 75.00% wheat. x is the average and s(x) is the standard deviation. All values are % by weight of the weight of the sample.

| | Wheat | Rye | Oats | Barley | Burnt | Wild oats | Damaged |
|---|---|---|---|---|---|---|---|
| | 74.42 | 4.97 | 4.70 | 5.02 | 5.72 | 0.00 | 5.17 |
| | 74.37 | 5.11 | 4.61 | 5.38 | 5.32 | 0.00 | 5.21 |
| | 74.84 | 4.96 | 4.91 | 4.87 | 5.33 | 0.05 | 5.04 |
| | 75.42 | 5.31 | 4.78 | 4.85 | 4.65 | 0.20 | 4.78 |
| | 74.94 | 5.13 | 4.77 | 4.73 | 4.92 | 0.09 | 5.42 |
| | 74.63 | 5.08 | 4.92 | 5.00 | 5.01 | 0.00 | 5.35 |
| | 74.79 | 5.27 | 4.63 | 5.23 | 4.98 | 0.00 | 5.10 |
| | 74.36 | 5.54 | 4.80 | 4.95 | 5.40 | 0.03 | 4.92 |
| | 74.15 | 5.35 | 4.60 | 5.38 | 5.58 | 0.00 | 4.93 |
| | 74.93 | 5.69 | 4.50 | 4.86 | 4.85 | 0.02 | 5.15 |
| x | 74.68 | 5.24 | 4.72 | 5.03 | 5.18 | 0.04 | 5.11 |
| s(x) | 00.36 | 0.23 | 0.13 | 0.27 | 0.37 | 0.06 | 0.19 |

It is expected that the values above can be improved when the conversion from size to weight is based on a larger number of kernels.

Figure 2:
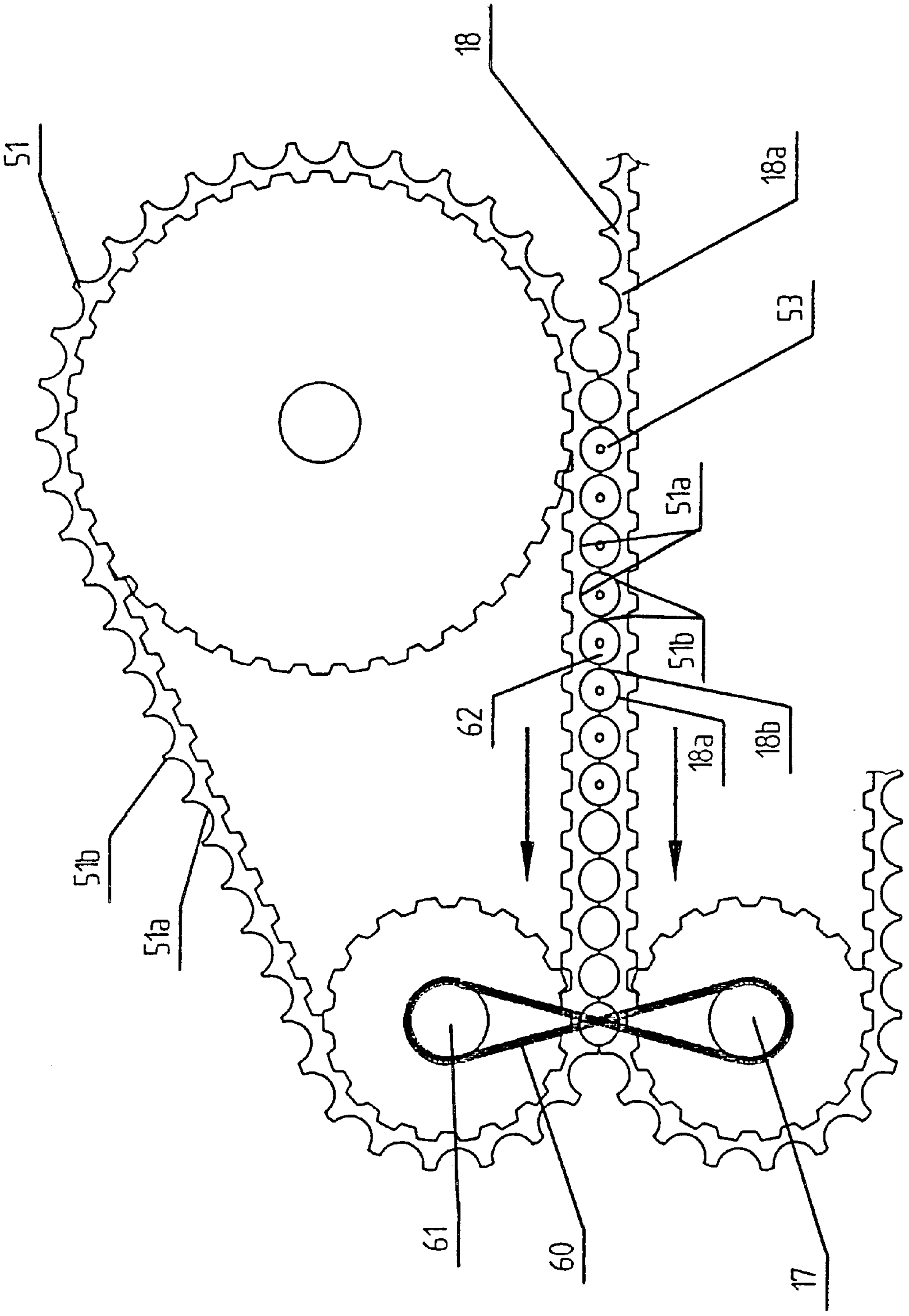
FIG. 2 is a schematic side view of a separation device which may supplement the device in FIG. 1.
Figure 3:
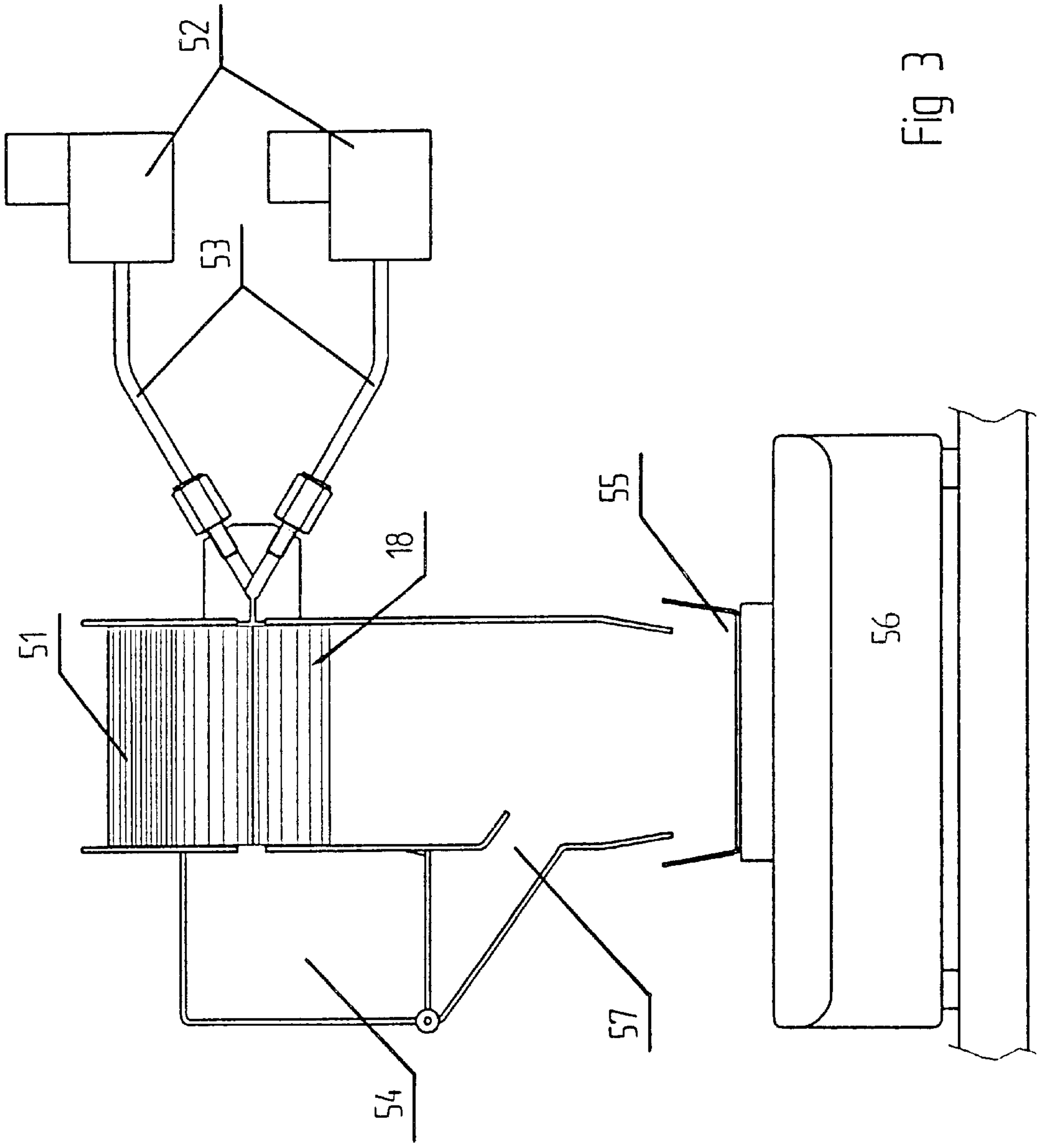
FIG. 3 is an end view of the separating device in FIG. 2, and a scale.

As an alternative to the above-mentioned weight determination by means of the size of the kernels, the weight of the different fractions can be determined by means of the arrangement schematically shown in FIGS. 2 and 3, by which the device in FIG. 1 may be supplemented. The arrangement is mounted at the end of the second belt 18 after the position in which the camera 40 takes an image of the kernels on the belt. The arrangement comprises a third belt 51 which constitutes a cover over the second belt 18 and which is driven synchronously therewith by means of a toothed belt 60 connecting the wheel 17 of the second belt 18 to a toothed shaft 61 of the third belt. The third belt 51 comprises alternating grooves 51*a* and ridges 51*b* which are aligned with grooves 18*a* and ridges 18*b* in the second belt 18, thereby forming a plurality of channels 62 between the sides of the second and third belt facing each other.

The arrangement in FIGS. 2 and 3 further comprises a separating means for each channel formed by the belt and the cover. The separating means comprises a compressed-air source 52 and a pipe 53 connecting the compressed-air source with the mouth of the corresponding channel, when the cover 51 is lowered onto the belt. On the other side of the belt there is a container 54 directly opposite the mouths of the channels. Below the end of the belt 18 there is arranged a further container 55 on a scale 56. The first container 54 can be connected to the second container 56 via a duct 57.

To explain the function of the weighing arrangement shown in FIG. 2, use can be made of an example with a wheat sample with an admixture of rye, in which the weights of the wheat fraction and the rye fraction, respectively, are to be determined. Now supposing that the computer 42, in a first moment, identifies one or more rye kernels in an image taken by the camera 40. When the belt 18 has advanced one step for the camera to take the next image, then the surface of the belt, on which the kernels in the preceding moment were analysed, will be covered by the third belt 51, and the identified rye kernels will be positioned in one or more of the channels 62. The computer 42 activates the compressed-air source(s) 52 in whose corresponding channels a rye kernel has been identified. The rye kernel and wheat kernels, if any, which are positioned in the same channel, are blown into the container 54, whereupon the belt 18 can be advanced when the next image should be taken. The kernels remaining on the belt 18, which thus are wheat kernels, fall down into the container 55 as the belt advances. When a sample has been completely analysed, the wheat kernels are weighed in the container 55 by means of the scale 56. Subsequently, the wheat kernels are emptied, and the rye kernels and the wheat kernels, if any, in the container 54 are let down into the container 55 and weighed. By means of these two weighing operations and knowledge of the number of wheat kernels and, respectively, wheat and rye kernels weighed on the two occasions, the weight of the wheat fraction and the rye fraction, respectively, in the entire sample can be determined.

Of course, there may be more than one container 55. If the sample, besides rye, contains an admixture of barley, the barley kernels can be blown into a special container and weighed separately.

The arrangement in FIGS. 2 and 3 can also be used to blow away objects which the computer cannot identify. In this case, a signal is suitably emitted to an operator to request a manual check.

As an alternative to separation by means of compressed-air blowing like the technique illustrated in FIGS. 2 and 3, it would be possible to use a vacuum suction device to pick identified kernels from the belt.

As an alternative to the third belt, it would be possible to use a cover whose lower side is formed with grooves and ridges and which is lowered onto the second belt, thereby forming channels.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method for automatic classification of granular products which are handled in bulk and which include cereal kernels, the method comprising the steps of:

spreading the kernels to form one layer and to prevent overlapping of said kernels;

producing digital images of said kernels, each digital image containing a plurality of said kernels, each kernel being present in only one of said digital images;

producing input signals for each kernel by means of picture element values calculated from picture elements of said digital images;

feeding said input signals to a neutral network;

classifying each kernel by the neural network in one of a plurality of classes representing the kernels on the basis of the input signals;

locating each kernel of the digital images by picture elements having an intensity or color exceeding a predetermined value, a coherent area representing each kernel being determined by a longitudinal axis connecting picture elements having similar values;

checking whether kernel overlapping occurs by generating a histogram of the picture elements representing a kernel in an x-direction;

making an envelope curve of the histogram, said envelope curve having terminal points;

determining whether a minimum exists between the envelope curve terminal points in a y-direction; and if a minimum exists, the coherent area corresponding to the histogram generation is divided, and each divided area is processed as an individual kernel.

2. The method as claimed in claim 1, further comprising the step of:

orienting the kernels essentially in a predetermined direction between the step of producing the digital images containing the plurality of kernels.

3. The method as claimed in claim 2, further comprising the step of:

producing said input signals by weighted addition of picture element values for a plurality of the picture elements representing each kernel.

4. The method as claimed in claim 3, further comprising the step of:

performing said weighted addition of said picture element values in a componentwise manner for each picture element of the plurality of picture elements representing each kernel.

5. The method as claimed in claim 1, further comprising the steps of:

converting said picture elements of the digital image to values representing red, green, and blue intensity components, and then converting said values into values representing hue, saturation, and intensity components.

6. The method as claimed in claim 5, further comprising the step of:

determining the size or shape or color of each kernel by the values representing the red, green, and blue intensity components.

7. The method as claimed in claim 1, further comprising the step of:

determining the weight of each kernel on the basis of size of an area of the picture elements representing each kernel.

8. The method as claimed in claim 1, further comprising the steps of:

after classifying, separating kernels classified into a first class;

weighing the kernels separated into said first class; and weighing non-separated kernels.

9. A device for automatic classification of granular products which are handled in bulk and which include cereal kernels, the device comprising:

a camera for producing digital images of said kernels, each kernel being present in only one of said digital images;

a presentation device for spreading and presenting a plurality of the kernels simultaneously in a lens coverage of said camera; and a neural network connected to said camera, said neural network classifying each of the kernels in one of a plurality of classes representing the kernels on the basis of said digital images, said presentation device further comprises means for orienting the kernels to form one layer and to prevent overlapping of said kernels, said means for orienting the kernels includes a conveyor belt having indentations, said indentations are shaped similar to said kernels and are oriented in a common direction, said presentation device further includes vibrating means to vibrate said conveyor belt and to orient said kernels thereon.

10. The device as claimed in claim 9, the device further comprising:

means for separating predetermined kernels from remaining kernels after classifying said plurality of kernels.

11. The device as claimed in claim 10, wherein said means for separating comprises means for blowing away predetermined kernels from said presentation device.

* * * * *